No. 644,451.  
J. OWEN.  
COMBINED RAY FILTER AND HALF TONE GRATING.  
(Application filed Aug. 24, 1896.)  
Patented Feb. 27, 1900.
(No Model.)
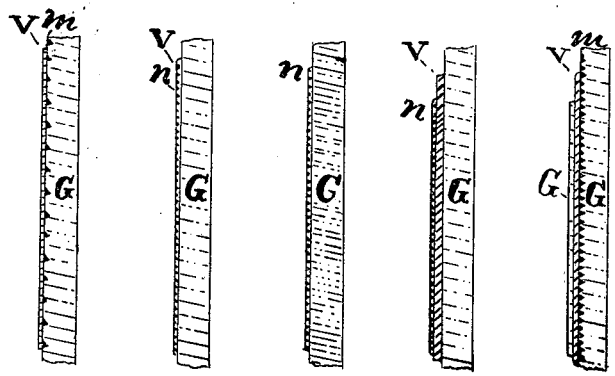

UNITED STATES PATENT OFFICE.

JOHN OWEN, OF MERCHANTVILLE, NEW JERSEY.

COMBINED RAY-FILTER AND HALF-TONE GRATING.

SPECIFICATION forming part of Letters Patent No. 644,451, dated February 27, 1900.

Application filed August 24, 1896. Serial No. 603,722. (No model.)

*To all whom it may concern:*

Be it known that I, JOHN OWEN, a citizen of the United States, residing at Merchantville, in the county of Camden and State of New Jersey, have invented a certain new and useful Improvement in a Combined Ray-Filter and Half-Tone Grating for use in Photomechanical Processes for Color-Printing, of which the following is a specification.

My invention relates more particularly to what is known as the "three-color process," in which, as now carried out, three negatives are first taken of the subject. From one of these the blue rays are shut out by a ray-filter of orange glass placed just behind the lens, a second has the yellow rays shut out by a violet-ray filter; the third the red rays by a green-ray filter. From these three negatives three positives are next taken and from the positives three grained or cross-lined negatives from which copper plates are made in the usual manner. It will thus be seen that for the making of the three copper plates nine distinct photographic operations are necessary before you are ready to print on the copper. Besides the waste of time and labor in this process, it has the further disadvantage that each rephotographing impairs the quality of the final result.

The object of my invention is to provide an improved construction whereby I am enabled to make the last negative of each series directly from the subject, and thus make three photographic operations take the place of nine. The attempt has often been made to do this with the ray-filter placed near the lens, as in taking the first negative of the above series; but inherent and for the most part unavoidable difficulties have prevented this way of working from coming into noticeable use.

My invention consists of a ray-filter and a half-tone grating combined in approximate optical coincidence by either of the following methods: first, by flowing an ordinary engraved or etched grating with collodion, gelatin, varnish, or other medium holding in solution the colors in ordinary use as ray-filters; second, by making the grating by photography and staining the film used by immersing it in the appropriate color prepared as dyes; third, by selecting a sheet of stained glass of suitable color intensity to answer as the ray-filter and making the grating on it by the usual photographic process; fourth, by preparing the ray-filters by the use of any suitable medium which is unaffected by the after processes and then making the grating on them either by photography or by other means in approved use, and, fifth, by making the grating on a plate of glass and placing the colored medium which is to act as ray-filter in optical contact therewith by any approved means, either with or without a cover-glass, as may be thought best.

The accompanying drawings are illustrative diagrams showing the relative position of the combined parts, the five figures corresponding to the five alternative methods above set forth.

Figure 1 shows a grating engraved or etched upon a sheet of glass and flowed with a colored medium. Fig. 2 shows a glass plate having upon it a grating made by a photographic process in a film which is stained the appropriate color. Fig. 3 shows a sheet of stained glass which has a grating formed upon it by a photographic process. Fig. 4 shows a sheet of glass coated with a colored medium which has a grating formed upon its surface in any suitable manner. Fig. 5 shows a sheet of glass which has a grating formed on its surfaces with a colored medium in optical contact with the grating and protected by a cover-glass.

In the figures, G represents clear glass, C colored glass, and V a colored medium other than glass.

$m$ is an arbitrary or conventional representation of an engraved half-tone grating, and $n$ a similar representation of a grating made by photography.

Excepting their specified combination with each other the construction of the ray-screens and half-tone gratings shown in the figures is in all respects the same as that of similar screens and gratings now in use.

The use of my combined filter and grating does not call for any change in the colors used. The gratings $m$ or $n$ may be either single-line, cross-line, or granular. I prefer to use a granular screen in making the negatives for the first two plates that are printed and a cross-line grating for the last one.

For reasons which will readily occur to persons skilled in the art I prefer to place the combined ray-filter C or V and grating $m$ or $n$ very close to the plate for the negative, and I therefore prefer to use a grating which is designed to be placed in close contact with the photographic plate—as, for example, one of the "vignetted screens" described by E. Deville on page 45 of volume 1 of the "*Practical Process Worker and Photo-Mechanical Printer;*" but I do not limit myself to the precise screen or grating therein described, as any grating which can be used in the same way will answer equally well the purposes of my invention.

Aside from placing them, as above specified, as near the photographic plate as the type of grating used will permit my combined filters and gratings call for no different manipulation than is required for the same filters and gratings when uncombined.

I do not claim as my invention any combination which does not contain an element that has the well-known characteristic effect of a half-tone grating.

Having now fully described my invention and the manner of using it, what I claim, and desire to secure by Letters Patent, is—

1. A half-tone grating having a colored-ray filter in approximate optical coincidence with its working surface; substantially as and for the purpose set forth.

2. A combined half-tone grating and colored-ray filter which have their approximation to each other carried to a point at which they cease to reflect light to each other.

3. A half-tone grating and a colored-ray filter in optical contact therewith in combination with each other and with an inflexible, transparent support.

4. The combination of a translucent sheet, a half-tone grating which forms an integral part of the sheet, and a colored-ray filter in optical contact with the half-tone grating, all as set forth.

5. The combination of a half-tone grating which has been photographically formed in the substance of a film with a staining for the film; substantially as and for the purpose set forth.

In testimony whereof I have hereunto set my hand, in the presence of two witnesses, this 20th day of August, 1896.

JOHN OWEN.

Witnesses:
H. A. DIFFENDAFEN,
FRANK VERYUSON.